United States Patent Office 2,819,835
Patented Jan. 14, 1958

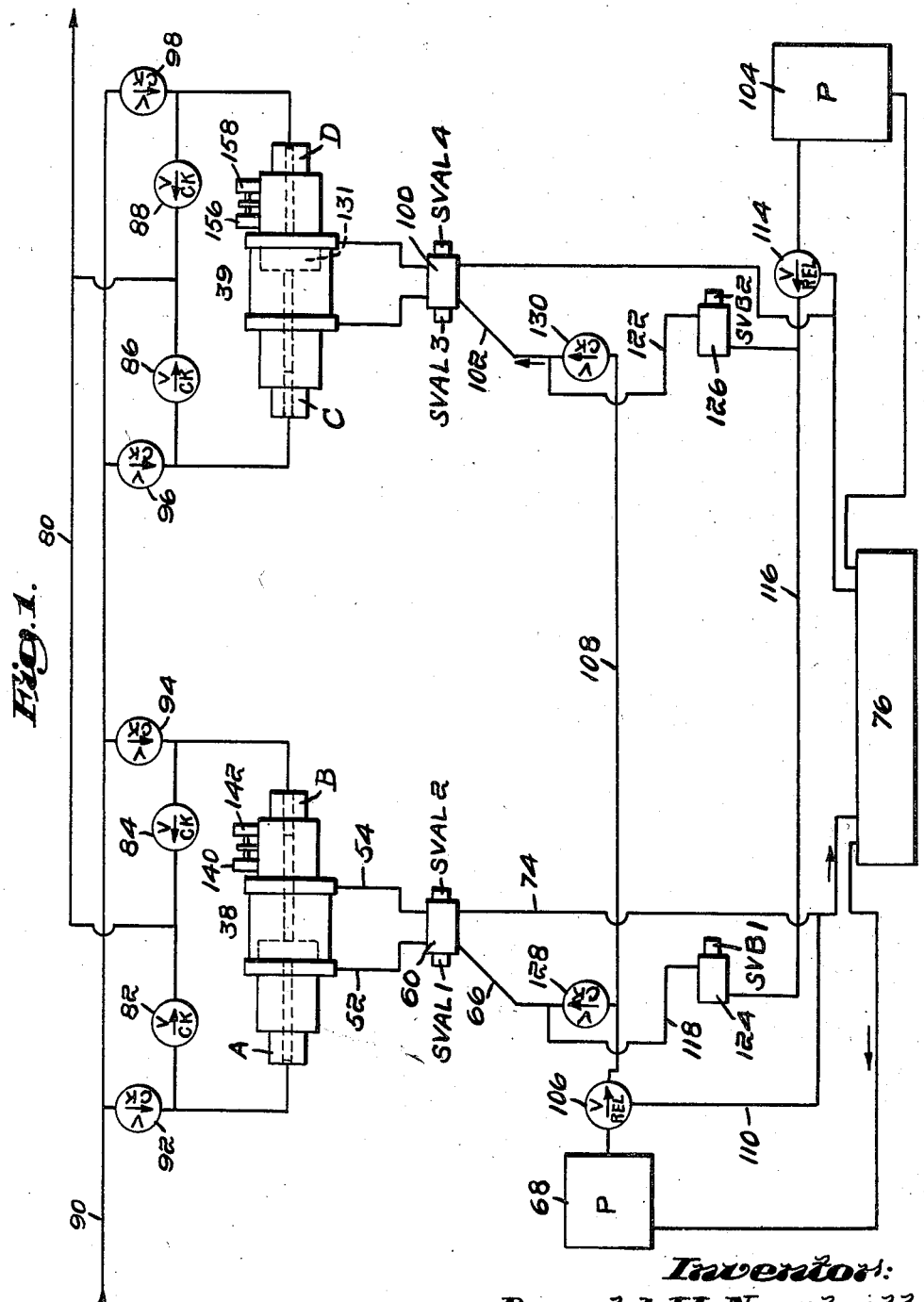

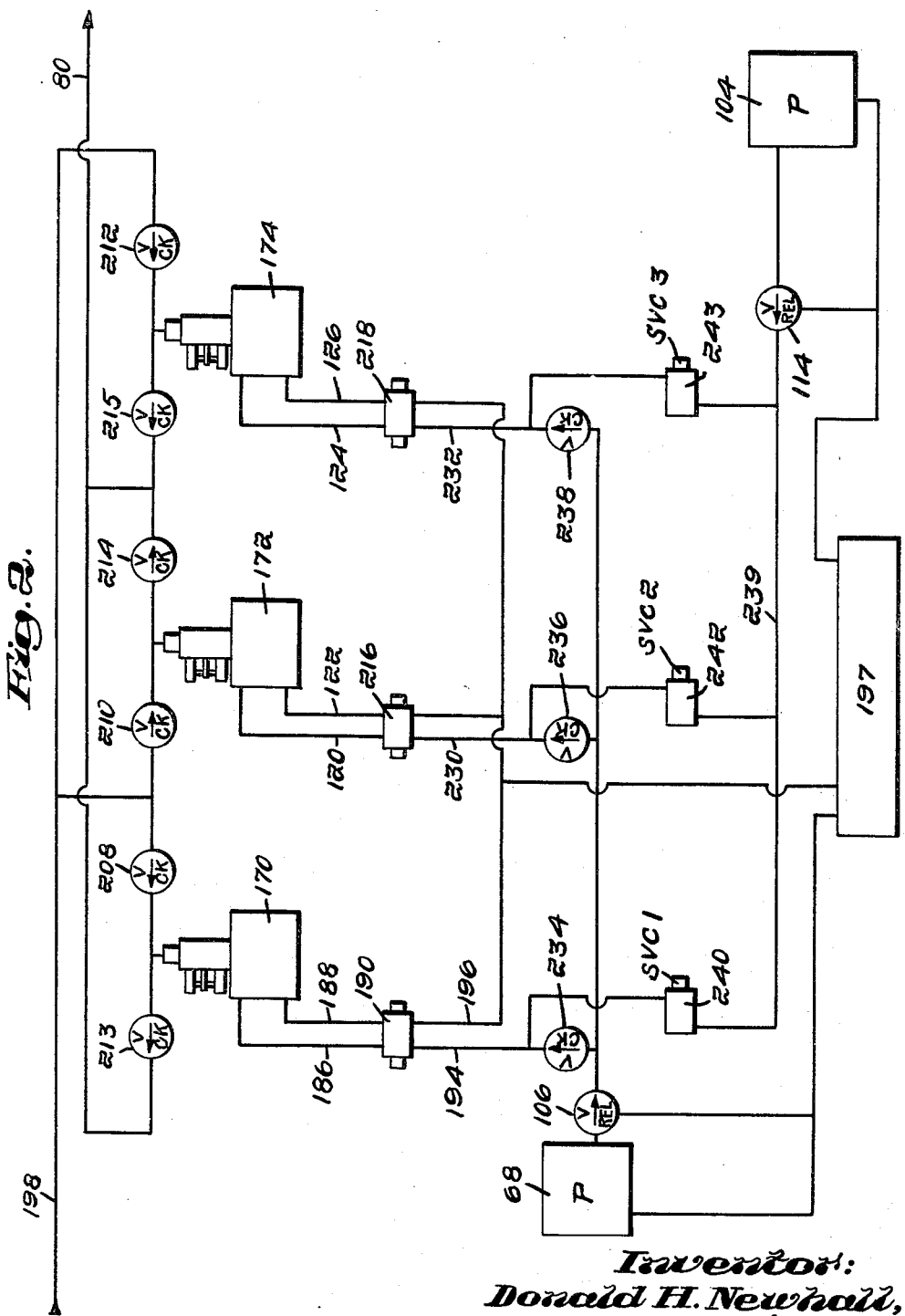

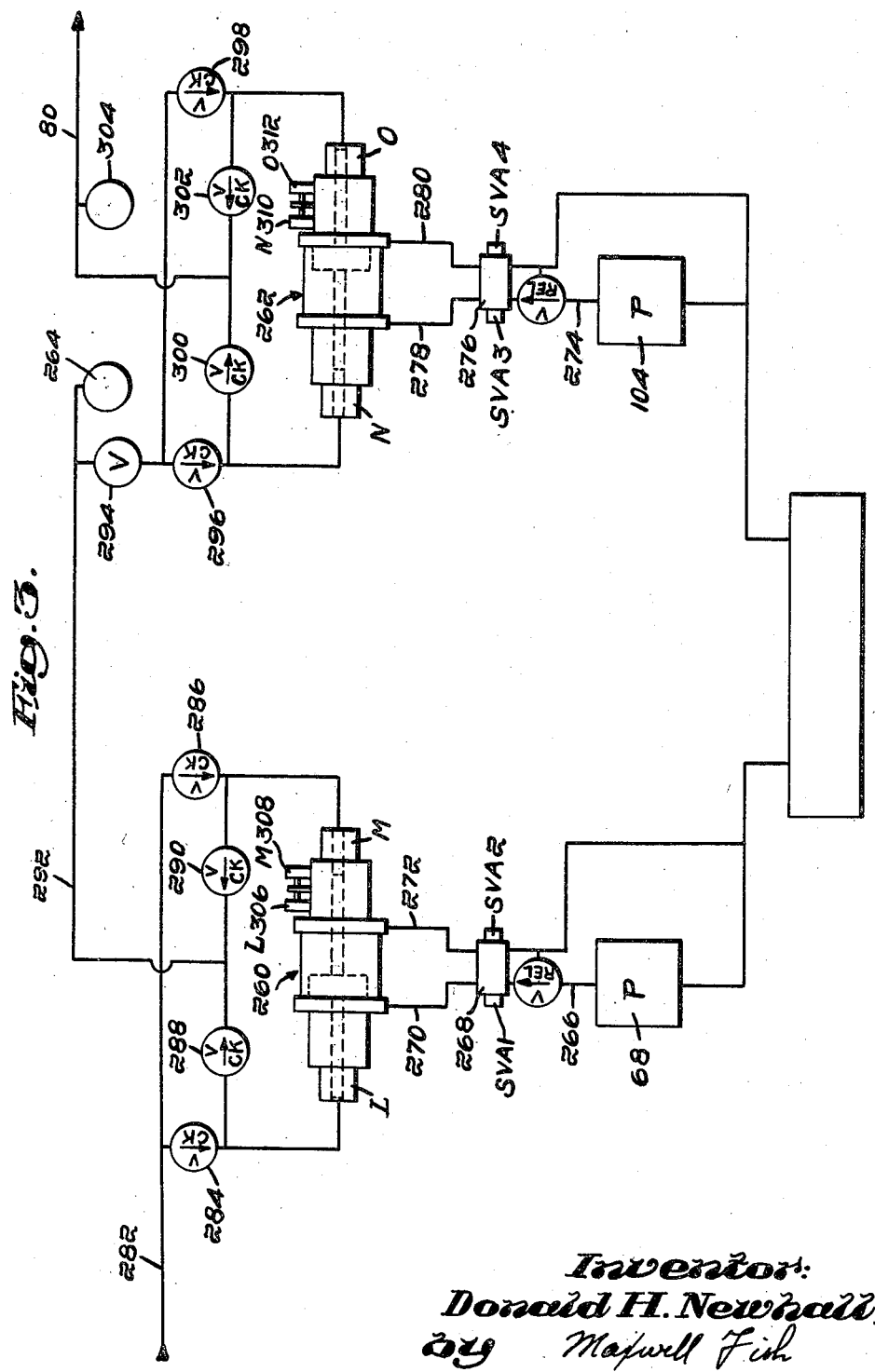

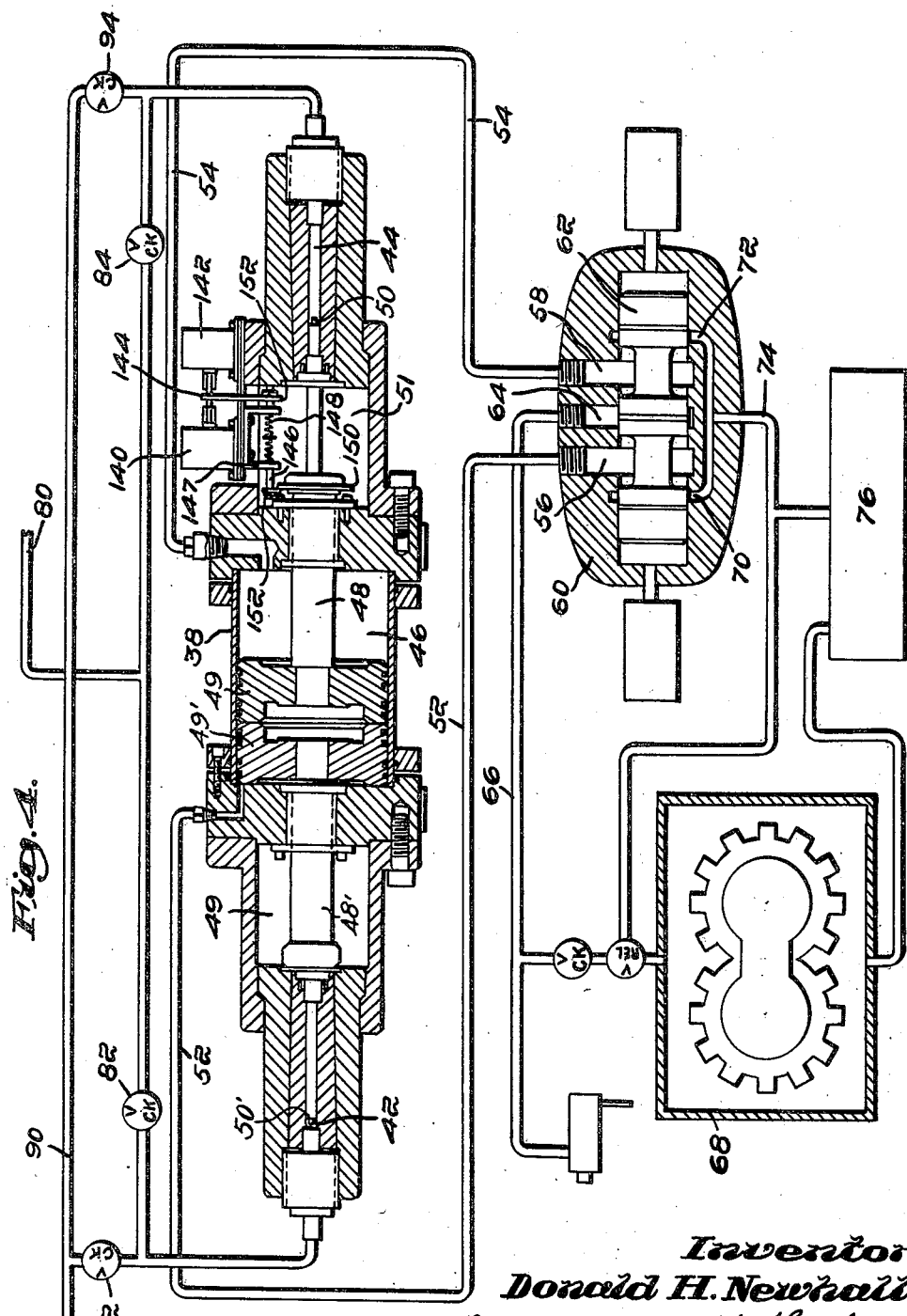

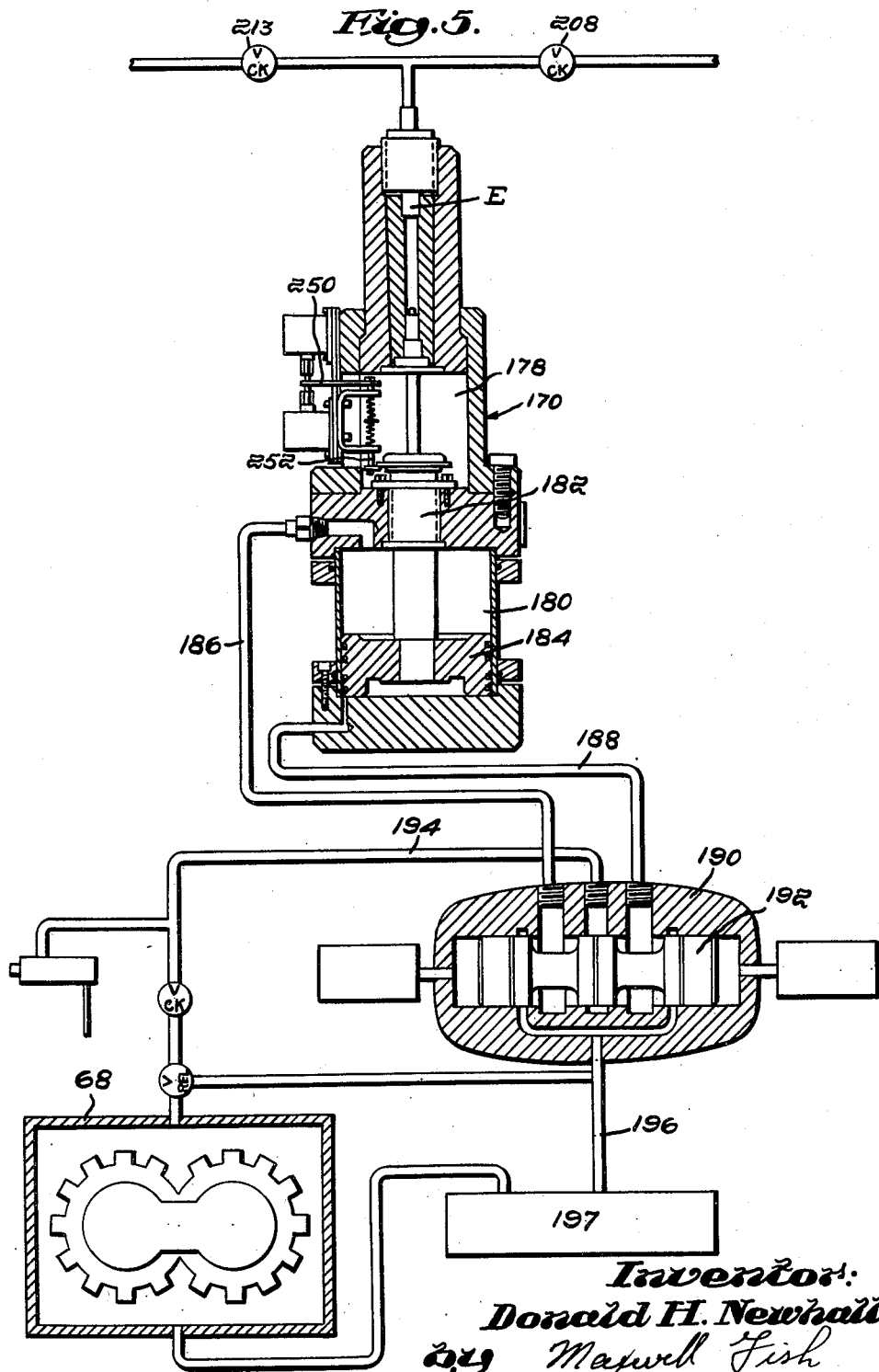

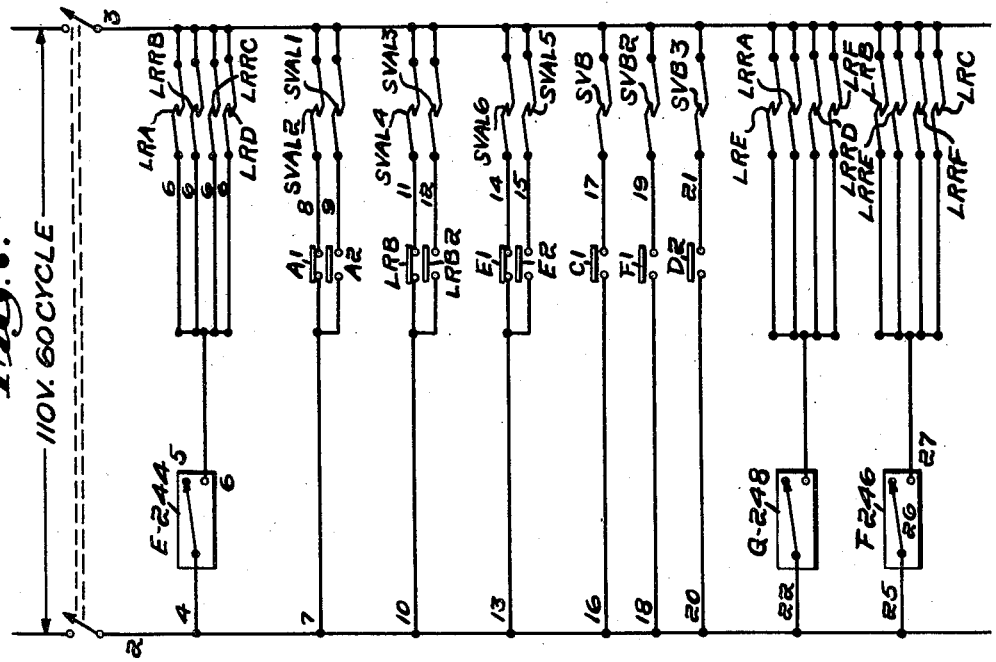
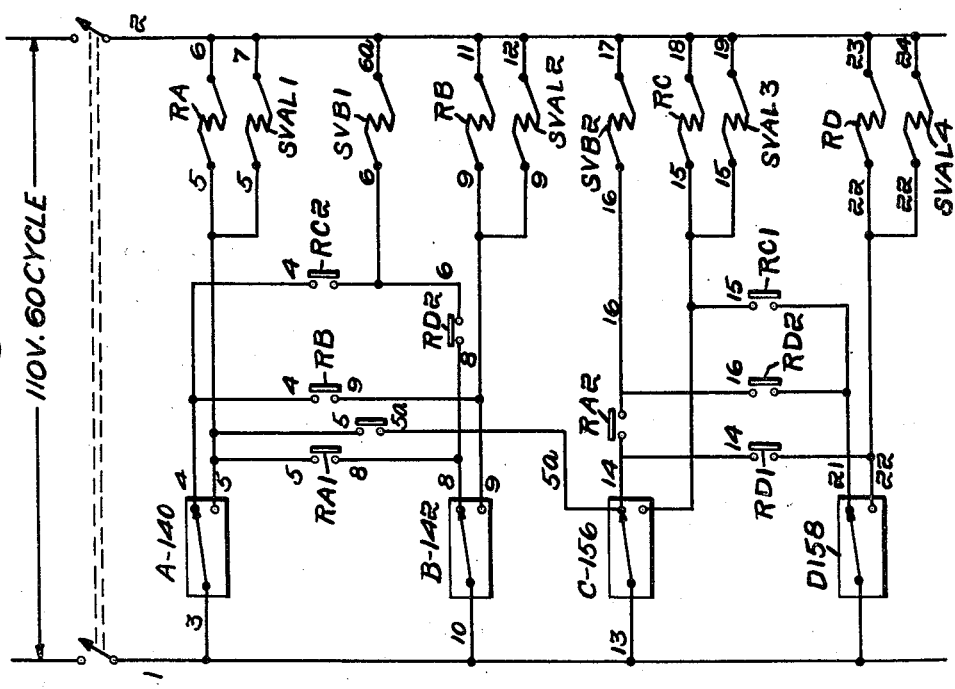

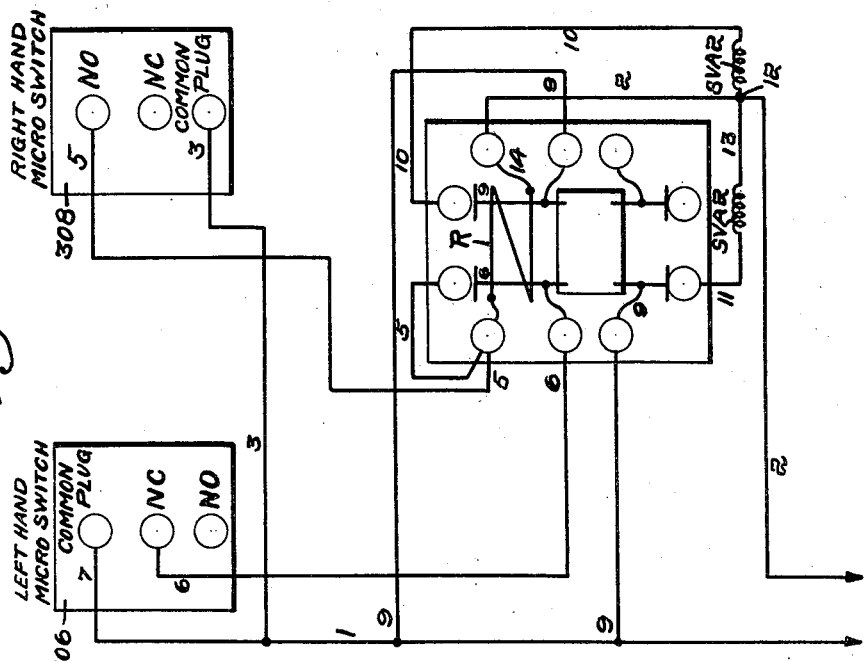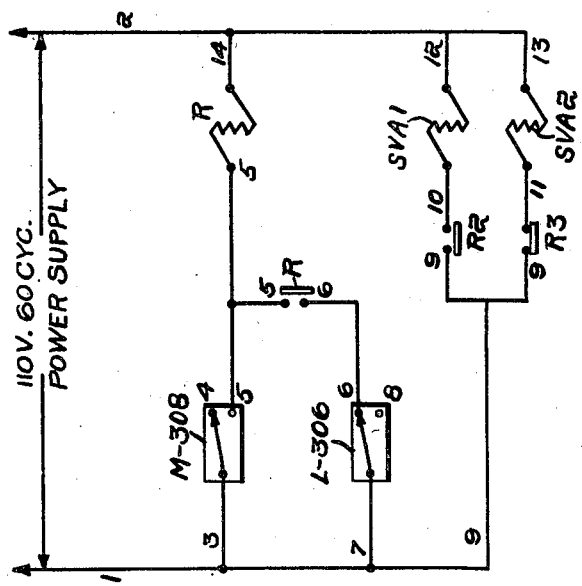

2,819,835

SYSTEM FOR DELIVERING A CONTINUOUS AND STEADY FLOW OF A COMPRESSIBLE FLUID AT HIGH PRESSURE

Donald H. Newhall, Walpole, Mass., assignor to Harwood Engineering Co., Walpole, Mass., a corporation of Massachusetts Application November 26, 1954, Serial No. 471,417

18 Claims. (Cl. 230—49)

The present invention relates to a system for delivering a continuous and steady flow of a compressible fluid at high pressure.

It has been found necessary, particularly for certain chemical processes, to supply a compressible fluid to the reaction at extremely high pressures which must be held uniform within close limits.

While apparatus has been devised as shown for example in my Patent No. 2,463,552, dated March 8, 1949 for High Pressure Hydraulic System, which is adapted for maintaining the flow of a fluid at a continuous substantially even pressure, such apparatus has been intended primarily for the delivery of relatively incompressible fluids, and is not adapted to operate with equal efficiency for maintaining an even flow of a highly compressible fluid at very high pressures. Apparatus of the type referred to comprises a plurality of high pressure cylinders or pumps having the high pressure faces thereof connected to a common delivery point and arranged to operate in a continuous overlapping sequence. The high pressure cylinders may be driven by any suitable means as for example the low pressure elements of hydraulically operated intensifier units. Specifically, it has been found that apparatus of the type referred to when employed for supplying a highly compressible fluid such as a gas at very high pressure operates in an uneven manner producing well defined pulsations or pips of pressure which occur whenever the load is shifted from one intensifier to the next of the series.

While apparatus of the type referred to has been found reasonably adequate for handling fluids having relatively low compressibility, as for example liquids, it has been found that fluids having a relatively high compressibility such as gases tend to show substantial pulsations including pronounced pips or gyrations of pressure, which take place whenever the load is shifted from one pumping unit to the next of the series.

It is a principal object of the present invention to provide a novel system of high pressure pumping units for delivering a continuous and steady flow of a compressible fluid at very high pressure, which is particularly constructed and arranged to operate with a maximum of efficiency for the delivery of fluids including gaseous fluids at extreme high pressures and at the same time to substantially eliminate the pulsations and pips or gyrations of pressure normally encountered upon transfer of the pumping function from one to another high pressure pumping unit of the group.

A feature of the invention consists in first compressing the compressible fluid to a charge pressure which is only slightly below the desired delivery pressure level so that the compressibility is substantially taken out of the fluid, and in thereafter operating a series of high pressure pumping units in sequence to effect a continuous even delivery of the compressible fluid at the slightly higher delivery pressure rate.

In accordance with the invention I provide a system of compressible fluid high pressure pumping units including at least two high pressure chambers with movable high pressure piston elements for compressing a compressible fluid at high pressure, and cooperating actuating means which may, for example, be the low pressure chambers of a series of intensifier units with low pressure piston elements connected for movement with the respective high pressure piston elements. Means are provided in the system for loading each high pressure cylinder in turn with compressible fluid at slightly below the desired delivery pressure, and the high pressure piston element associated with the loaded high pressure cylinder is thereafter actuated by a suitable power transmitting devices as, for example, through the application of non-compressible fluid pressure in the cooperating low pressure chamber of a conventional intensifier unit to deliver compressible fluid at the delivery pressure.

More specifically, in accordance with the invention the pressures employed are such that the charge pressure to which the compressible fluid is subjected may be within approximately 1% of the delivery pressure so that the transfer of the delivery from one intensifier unit to the other is accompanied by a minimum disturbance in the continuous delivery of the compressible fluid at the desired pressure. With this arrangement a very small actuating impulse only is required to start delivery of the compressible fluid from the charged high pressure chamber. Any tendency to fluctuate or pressure gyration upon the transfer of the pumping function from one to another intensifier unit is substantially eliminated.

It will be understood that the apparatus and method of the present invention distinguish specifically from the ordinary stage pumping operation by means of which fluids are most efficiently subjected to high pressure in the utilization of a charge pressure level which is very close to the desired delivery pressure level and which is employed for the particular purpose of eliminating variation of the fluid pressure during delivery.

The present invention relates specifically to a device and method for delivery in a continuous sequence successive increments of compressible fluid supplied at substantially the desired high pressure without fluctuation or variation of flow in the delivery manifold of the device.

In one form of the invention a double intensifier is provided having two high pressure chambers which are connected through appropriate check valves to a common delivery manifold. Each of the high pressure chambers referred to is connected also to a supply conduit through which a compressible fluid is delivered through appropriate check valves to the respective high pressure chambers at a charge pressure. In this form of the apparatus the charge pressure is maintained by means of a second double intensifier unit having two high pressure chambers and cooperating low pressure chambers by means of which compressible fluid is built up to the desired value. In order to eliminate so far as possible pulsations which are inherent in the operation of an intensifier unit of this type an accumulator tank is provided having a sufficient capacity to substantially dissipate or to reduce to a minimum these pulsations of the charge pressure. The compressible fluid is delivered to each high pressure chamber of the delivery intensifier unit in turn at a charge pressure which is maintained at a level only slightly below the specified delivery pressure, this differential being in the order of about 1%. With this arrangement in which the compressible fluid is maintained at the charge pressure at all times in both of the high pressure chambers of the delivery intensifier unit, a very slight impulse only through the application of non-compressible fluid to the cooperating low pressure chambers is required to impart a continued oscillatory movement to the piston elements of the unit thereby to maintain a continuous pip-free delivery of the compressible fluid to the delivery conduit.

In another form of the invention a plurality of double acting intensifier units or alternatively a group of single acting intensifier units are provided of which the high pressure chambers are connected in parallel relation to a common delivery manifold. Suitable check valves are provided in the connections for causing the high pressure piston elements of the intensifier units to deliver compressible fluid to the manifold at a predetermined delivery pressure. Each of the high pressure chambers referred to is connected also to a supply conduit through which a compressible fluid is delivered through appropriate check valves from supply at substantially lower pressure. In this form of the apparatus a non-compressible low pressure fluid medium is delivered to the associated low pressure chambers at each of two regulated actuating pressures which correspond respectively with a charge pressure imparted thereby to the high pressure compressible fluid, and to a delivery pressure imparted by said low pressure medium to the high pressure compressible fluid.

The arrangement of the low pressure fluid delivery controls is such that the non-compressible low pressure fluid medium is supplied to each low pressure chamber of the respective units in succession at the lower of said actuating pressures to cause each low pressure piston element and the connected high pressure piston element to move through a portion of its stroke and thereby to compress the compressible high pressure fluid in the high pressure chamber to the pre-delivery charge value. The valve connections to the low pressure chambers are thereupon further conditioned to supply the low pressure fluid medium to the intensifier units charged in the manner described at the higher of said actuating pressures, thus causing the low pressure piston element and high pressure piston element associated therewith to be moved to the limit of their delivery stroke and thus to effect delivery of the high pressure medium to the common delivery manifold at the delivery pressure. The valve arrangement is such as to cause the several intensifier units to operate in sequence, preferably overlapping, so that a continuous delivery of the high pressure medium into the delivery manifold is effected.

In accordance with the form of the invention above described the piston element associated with each intensifier unit in turn is retracted to draw compressible high pressure fluid medium into the high pressure chamber and is thereafter started upon its advancing movement which is continued through a short distance until the compressible fluid medium is brought up to the pre-delivery charge pressure, whereupon the movement of the piston element ceases. When the low pressure fluid medium is now admitted to the low pressure chamber at the higher of said regulated pressure, which corresponds to the delivery pressure set for the high pressure medium, movement of the piston elements is continued to cause the compressible fluid medium to be delivered at the desired delivery pressure.

An essential element in the construction and operation of the apparatus described consists in the building up of a charge pressure in each high pressure chamber in turn which is only slightly, or in the order of 1% and not more than 10%, less than the delivery pressure so that each intensifier unit is rendered operative in sequence to deliver the compressible fluid at exactly predetermined delivery pressure without any pulsations or pressure fluctuation of the delivery pressure at the delivery point.

With these and other objects in view as may hereinafter appear, the invention consists also in the devices, combinations and arrangements of parts hereinafter described and claimed, which together with the advantages to be obtained thereby will be readily understood by one skilled in the art from the following description taken in connection with the accompanying drawings, in which Fig. 1 is a somewhat diagrammatic view of two double intensifier units arranged in parallel having the high pressure chambers thereof connected to a common delivery manifold, and having the low pressure chambers thereof connected with two pumping units which are regulated and controlled to cause each high pressure chamber in turn to be charged with a compressible fluid medium at a charge pressure slightly below the desired delivery pressure, and thereafter to discharge said compressible fluid medium in sequence at the delivery pressure to maintain an exactly constant delivery pressure of the compressible fluid;

Fig. 2 is a modified form of a pumping assembly having three single intensifier units, the high pressure chambers thereof being connected in parallel relation to a delivery manifold, and the low pressure chambers thereof being connected to a low pressure fluid supply system including a delivery pressure pumping unit, a pre-delivery pressure pumping unit and control means for supplying low pressure medium selectively from said units to the low pressure chambers of the several intensifier units;

Fig. 3 shows a further modification of the invention comprising two double intensifier units, one of which has the two high pressure chambers thereof connected in parallel relation into a delivery manifold and arranged to be charged at the pre-delivery pressure by means of a separately operated double intensifier unit and an accumulator tank associated therewith;

Fig. 4 is an enlarged detailed view partly in section of one of the double intensifier units above illustrated and of the four-way valve, and gear pump for supplying a non-compressible fluid medium at a regulated low pressure to the low pressure chambers of the intensifier unit;

Fig. 5 is a somewhat diagrammatic view partly in section of a single intensifier unit of the general type illustrated particularly in Fig. 2 in combination with the four-way valve, and the gear pump by means of which non-compressible low pressure fluid medium is supplied to the low pressure chamber of the intensifier unit;

Fig. 6 is a single line electrical diagram of the electrical connections required for the operation of the apparatus shown in Fig. 1;

Fig. 7 is a single line electrical diagram of the electrical connections required for the operation of the apparatus shown in Fig. 2;

Fig. 8 is a single line electrical diagram of the electrical connections required for the operation of one of the double intensifier units shown in Fig. 3; and Fig. 9 is a full line diagram of the electrical connections shown in Fig. 8.

The invention is herein disclosed as embodied in a high pressure system which is adapted for delivering a continuous flow of a compressible fluid at high pressure to a process under uniform conditions without interruption and at a pressure which is kept at an even level within narrow limits.

The present invention is adapted, for example, for the delivery of gaseous fluid to a process which may, for example, be the manufacture of polyethylene in which the pressure is maintained at a level in the order of thirty thousand pounds per sq. inch, and in which pressure deviations within extremely narrow limits in the order of 1% or less of the total pressure have been found to arrest or otherwise interfere with the reaction.

More specifically, in the preferred embodiments of the invention shown a plurality of intensifier units are provided which are activated by accurately regulated non-compressible fluid pressures, and which are combined in such a manner as to avoid any tendency to pulsation, or to the momentary pressure changes or pips associated with the transfer of one to another intensifier unit. While it is preferred to employ intensifier units it will be understood that the invention in its broader aspects contemplates the use of any available power means including mechanically actuated pistons for building up the desired delivery and charge pressures required.

In each of the embodiments of the invention disclosed, the intensifier units are arranged with at least two high pressure chambers thereof connected in parallel relation to a common delivery manifold for the successive delivery of increments of compressible fluid at a predetermined delivery pressure. In each case additional means are provided which become operative prior to the delivery stroke of each intensifier unit in turn to charge the high pressure chamber with said non-compressible fluid at a predelivery level of pressure which may be in the order of 1% less than the delivery pressure. It will be understood that this differential may, if desired, be as much as 10% depending upon the requirements of the process. This operation may be compared to the operation of a metering valve but with the addition of means for positively operating the several intensifier units in the desired sequence. Particularly where double intensifier units are employed so that the delivery pressure in one high pressure chamber is balanced against the pre-delivery pressure in the opposed high pressure chamber, a very small increment of power is required to operate the several units. In the three embodiments of the invention shown the operation of the intensifier units is effected by means of a non-compressible fluid, preferably oil, which is supplied to the low pressure side of the intensifier unit. A number of preferred arrangements of intensifier units and of cooperating low pressure pumping units are shown for most efficiently building up the pre-delivery pressure of the compressible fluid, and for, thereafter, delivering the said compressible fluid at the delivery pressure. While in the instance shown two pumping units are provided for delivering the non-compressible low pressure fluid at pressures which correspond with the pre-delivery and delivery pressures of the compressible fluid it will be understood that alternative arrangements may be employed including, for example, a single pumping unit for delivering the non-compressible fluid through restrictions of different sizes to provide the two different levels of pressure of the non-compressible low pressure fluid medium.

In the embodiment of the invention shown, particularly in Fig. 1 and Fig. 6, and as further illustrated by the illustration of Fig. 4, two double acting intensifier units designated respectively at 38 and 39 are provided connected in functional parallelism. Since all of the double intensifier units shown are identical in construction only the unit 38 will be specifically described in connection with the detail illustration of Fig. 4. Intensifier unit 38 consists of an outer shell or valve body having at the two ends thereof high pressure compression chambers 42, 44 of relatively small diameter, and an intervening low pressure chamber 46. Mounted within the valve body is a piston having two end portions of small diameter slidably fitted within the high compression chambers 42, 44, and a middle portion 48 of larger diameter which is fitted to slide within the low compression chamber 46.

Leakage chambers 49 and 51 interposed between the low pressure chamber 46 and the high compression chambers 42, 44 provide a convenient means for taking care of leakage of both high and low pressure fluids in the unit. As shown in Fig. 4 the piston 48 is made up of two separate members 48, 48', each consisting of a low pressure piston face, 49 and 49' respectively, and a high pressure face at 50 and 50' respectively, said members being normally in contact with one another to operate as a single unit.

The two ends of the low pressure chamber 46 are connected by pipe connections 52 and 54 with ports 56 and 58, respectively, formed in the casing 60 of a four-way valve generally indicated in Fig. 1 and illustrated in further detail in Fig. 4. The casing 60 is formed with a cylindrical aperture to receive a movable valve body 62. The casing 60 is also provided with a centrally disposed pressure inlet port 64 which is connected by means of a pipe 66 with a gear pump, generally designated at 68. Two exhaust ports 70 and 72 in the casing 60 connect with one another and with an exhaust pipe 74 with a reservoir or sump 76. The valve body 62 is formed with spool portions at each end and midway of the valve body 62, said spools being separated by two land portions. The valve body 62 is constructed and arranged so that movement of the valve body 62 to the right from the theoretical neutral position shown in Fig. 4 causes the pipe connection 54 with the right hand end of the low pressure chamber 46 to be connected with the exhaust port 72, and the pipe connection 52 with the left hand end of the low pressure chamber 46 to be connected with the supply port 64. Under these conditions the piston 48 of the intensifier unit is moved to the right. Movement of the four-way valve body 62 to the left operates in the reverse manner to move the valve body 48 of the intensifier unit to the left.

The high pressure chambers of the several units indicated respectively at A, B, C, and D in Fig. 1 are connected in parallel relation into a delivery manifold 80. A check valve is provided in each connection, the several check valves referred to being indicated rsepectively at 82, 84, 86, and 88. Each check valve is set to prevent back flow of fluid of the compressible fluid which is forced into the manifold 80 at the delivery pressure.

The high pressure chambers A, B, C, and D are also connected with a supply line 90 by means of which the fluid is supplied to the high pressure chambers at a lower supply pressure. The supply connections to the high pressure chambers A, B, C, and D have provided therein check valves indicated respectively at 92, 94, 96, and 98. The supply line check valves 92, 94, 96 and 98, inclusive, are set to permit the compressible fluid to be drawn freely through said valves into the high pressure chambers at a less than delivery pressure. As hereinafter more fully pointed out, it is intended that the intensifier pistons shall be operated in a predetermined sequence so that compressible fluid is drawn or sucked into each high pressure chamber in turn, and is subsequently discharged therefrom at delivery pressure.

The four-way control valve 60 associated with the double intensifier unit illustrated at the left side of Fig. 1, and in Fig. 4, and a four-way control valve 100 associated with the second double intensifier unit 39 in Fig. 1 are connected through their respective supply lines 66 and 102 with a low pressure fluid pumping and control system which includes the gear pump 68 which is connected and adjusted to supply a non-compressible liquid fluid under a pre-delivery pressure to one or the other of the four-way valves 60 and 100 in accordance with the operation of the control system hereinafter set forth. A second gear pump, indicated at 104 in Fig. 1 is similarly connected and operates in a similar manner to supply liquid fluid at a full delivery pressure to each of the four-way valves 60 and 100 in accordance with the dictation of the control system referred to.

As best shown in Fig. 1 the pre-delivery pressure pump 68 is connected through a relief valve 106, a pipe 108, and the branch conduits 66 and 102 with the respective four-way valves 60 and 100. The pressure control valve 106, referred to, is provided to control the output pressure from the pump 68 to an over-flow line 110 from the control valve 106 which leads to the exhaust. The second gear pump 104 is connected through a relief valve 114, a pipe line 116, and a branch line 118 with the supply line 66 to the pre-delivery unit four-way valve 60. A second branch pipe 122 from the pipe line 116 is connected with the supply line 102 to the four-way valve 100. A solenoid operated low pressure fluid control valve 124 in the branch pipe 118 and a similar solenoid operated low pressure fluid control valve 126 in the branch pipe 122 are employed to control the supply of the low pressure non-compressible fluid from the gear pump 104, respectively, to the four-way valve 60 associated with the left hand double acting intensifier, and to the four-way valve 100 associated with the right hand double acting intensifier.

It will be noted further that there is a check valve 128 in supply line 66 between the point of connection of the branch pipe 118 therewith and the pre-delivery pressure fluid pump 68, and a similar check valve 130 is provided in the supply pipe 102 between the point of connection with the other supply pipe with the branch line 122 and the pre-delivery pressure fluid pumping unit 68.

The hydraulic system illustrated in Figs. 1 and 6, comprising the two double intensifier units 38 and 39 connected in parallel relation and having a hydraulic control system for operating these units to charge each of the four high pressure chambers in turn with compressible fluid at a pre-delivery pressure, and thereafter for delivering said fluid at a delivery pressure, operates in the following manner:

The piston 48 of the double intensifier unit 38 and 131 of the second intensifier unit 39 are driven in sequence, first in one direction and then in the other. The first part of the stroke in each direction being utilized to charge the high pressure chamber with compressible fluid at the pre-delivery pressure as the piston is advanced by the introduction of low pressure non-compressible fluid into the corresponding low pressure chamber at the pre-delivery pressure level. As soon as this is accomplished the piston will dwell or pause until, in accordance with the sequence of operation, the piston is driven to the limit of its stroke under the impulse of low pressure fluid supplied at a delivery pressure level. As previously noted, it will be assumed that the compressible fluid is subjected to a pressure at the pre-delivery pressure level which is in the order of 1% more or less, less than the delivery pressure so that no lag or dip is experienced in the supply of the compressible fluid at the delivery pressure level to the delivery manifold 80. The sequence of operation is effected by means of micro-switches which are actuated sequentially by movement of each piston in turn to its limit position to cause the next alternate piston to complete its stroke at the delivery pressure.

The electrical system by means of which the double intensifier units 38 and 39 are operated in the manner above described as best shown in Figs. 4 and 6 includes four micro-switches, two of which are mounted on each of the intensifier units. The micro-switch A–140 and a micro-switch B–142 are mounted on the double intensifier unit 38 in spaced relation to one another to be engaged by a vertically disposed switch contact arm 144 which projects upwardly between the two switches, and at its lower end is mounted on a shifting rod 146 carried on a U-shaped bracket 147 within the leakage chamber of the double intensifier unit 38. Centering springs 148 coiled about the shifting rod 146 between the arms of the bracket 147 tend normally to maintain the shifting rod and switch contact arm 144 normally in an intermediate neutral position. A contact member 150 supported to move as a unit with the intensifier piston 48 is arranged upon movement of the piston to the left hand limit of movement to engage a stop 152 on the shifting rod 146 to engage the contact member 150 with the piston 48 to the right hand limit of movement causes the lug 150 to engage with a depending stop 152 formed integrally with the switch arm 144 to move the switch arm into engagement with the micro-switch B–142. It will be understood that the second intensifier 39 as shown in Fig. 1 is similarly provided with micro-switches C–156 and D–158 which are arranged to be automatically operated in a manner similar to that above described for micro-switches A–140 and B–142.

The four-way valve, generally designated at 60, is arranged to be actuated by two solenoids $SVAL_1$ and $SVAL_2$. The four-way valve 100 associated with the second intensifier unit 39 is controlled by means of two solenoids $SVAL_3$ and $SVAL_4$. The automatically operated low pressure fluid control valve 124 is controlled by means of a solenoid $SVB_1$ and the automatically operated low pressure fluid control valve 126 is similarly controlled by means of a solenoid $SVB_2$. There are also included in the electrical circuit a number of relay solenoids designated in Fig. 6 at RA, RB, RC, and RD, respectively.

The operation of the electrical circuit will be briefly described in connection with the electrical diagram of Fig. 6 as follows:

As the piston 48 approaches the limit of its movement to the left delivery compressible fluid at delivery pressure it will be understood that micro-switch A will be in its normally disengaged position with switch contact 3—4 closed and contact 3—5 open. Solenoid valve $SVB_1$ for the automatic control valve 124 is energized so that fluid at the full driving pressure is being supplied from pipe 104 to the intensifier unit, and solenoid $SVB_2$ for automatic low pressure fluid control valve 216 is closed so that pressure is being supplied to the second intensifier unit at the pre-delivery level from the pump 68. It will be understood also at this time that the solenoid $SVAL_3$ for the four-way valve 100, associated with the second intesifier unit 39, is energized and that solenoid $SVAL_4$ for valve 100 is deenergized so that the piston of the second solenoid is being urged to the left to charge high pressure chamber C at the pre-delivery compression level through fluid supplied from the pump 68.

When the piston of the first intensifier unit 38 reaches the left hand end of its travel the switch arm 144 is shifted to the left causing the arm of micro-switch A–140 to be shifted so that the normally closed contact 3—4 is open and the normally opened contact is closed. Relay RA is energized. Contact RA' 5—8 closes forming a holding circuit through the normally closed control contact 10—8 of the micro-switch B–142. RA contact 5—5a closes thus forming a holding circuit through the normally closed contact C–156. RA contact 14—16 closes energizing the control solenoid $SVB_2$ for the automatic control valve 126 to supply fluid at delivery pressure to the second intensifier unit to complete the movement of the piston thereof to the left at the full delivery pressure so that delivery to the delivery manifold 80 is maintained without any pulsation or break. $SVAL_1$ of the four-way valve 60 is energized to reverse the flow of the low pressure fluid to the first intensifier unit. At the same time the opening of the normally closed contact 3—4 of micro-switch A–140 causes solenoid RB to be deenergized which in turn permits contact RD 8—6 to be opened thus deenergizing control solenoid $SVB_1$ for the automatically controlled valve 124 to shut off the supply of fluid at the full delivery pressure from the low pressure pump 104. The opening of the micro-switch A–140 contact 3—4 is also effected to deenergize solenoid $SVAL_2$.

With the operation above described it will be appreciated that four-way valve 60, associated with the first intensifier unit 38 has been reversed so that its piston is travelling to the right, the low pressure fluid control valve 124 has closed so that high pressure chamber B of the intensifier unit 38 is being charged at the pre-delivery level, and the low pressure fluid control valve 126 has been opened supplying low pressure fluid at the full compression delivery level from pump 104, so that high compression fluid is delivered to the process at delivery pressure from the high compression chamber C of the second intensifier unit.

Next in the order of operation it will be assumed that the piston associated with the second intensifier unit 39 reaches the limit of its movement to the left delivering compressible fluid at delivery pressure from the high pressure chamber C. The micro-switch C–156 is actuated in the manner described in connection with micro-switches A–140 and B–142 breaking the normally closed contact 13—14 and closing the normally opened contact 13—15. Solenoid SVB$_2$, associated with the low pressure fluid valve 126 is deenergized causing this valve to be closed so that liquid fluid is now supplied to the second intensifier unit 39 from pump 69 causing high compression chamber D to be charged at pre-delivery level. Contact 13—15 of micro-switch contact C–156 closes energizing relay RC. RC contact 15—21 closes forming a holding circuit through the normally closed contact 2—121 of micro-switch D–158. Solenoid SVAL$_3$ of the four-way valve 100 for the second intensifier unit is energized shifting the four-way valve to the left so that the low pressure fluid is directed to the left hand end of the second intensifier unit 39 to move the same toward the right causing high pressure chamber D to be charged at pre-delivery pressure. Solenoid SVB$_1$ for the automatic valve 124 is energized causing said valve to open supplying the low pressure fluid at the full delivery level from the pump 104. Compressible fluid is now delivered at delivery pressure to the manifold 80 from the high pressure chamber B.

Next in order of operation it will be assumed that the piston 48 of intensifier 38 reaches the limit of its movement to the right completing its discharge of compressible fluid at delivery pressure from high pressure chamber B to manifold 80. Micro-switch B–142 is actuated opening contact 10—8 and closing contact 10—9. The opening of the normally closed contact 10—8 deenergizes relay RA and also solenoid SVAL$_1$ for four-way valve 60. Opening of the micro-switch B–142 contact 10—8 also opens the holding circuit for solenoid SVB$_1$ for low pressure delivery valve 124 which is closed causing low pressure fluid to be delivered to intensifier unit 38 to charge high pressure chamber A at the pre-delivery level. The closing of micro-switch contact 10—9 energizes relay RB. RB contact 4—9 closes thus forming the holding circuit through the normally closed contact 3—4 of micro-switch A–140. Solenoid SVAL$_2$ is energized shifting the position of four-way valve 60 and reversing the direction of the intensifier plunger 48. Control solenoid SVB$_2$ is energized so that low pressure control valve 126 is energized to supply low pressure fluid at delivery level from pump 104 to the second intensifier unit 39. At this time a four-way valve 100 is conditioned to drive the intensifier piston to the right for delivery of the compressible fluid from high pressure chamber D at the full delivery pressure. As the piston of the second intensifier 39 reaches the limit of its movement to the right completing its delivery of fluid at delivery pressure from high pressure chamber D to the manifold 80, the normally closed contact of micro-switch D–158 contact 20—21 is opened and contact 20—22 is closed. Opening of contact 20—21 breaks the holding circuit to relay RC which is deenergized together with solenoid SVAL$_3$ for four-way valve 100. Control solenoid SVB$_2$ is similarly deenergized causing low pressure delivery valve 126 to be closed and shutting off the supply of low pressure fluid at delivery pressure from pump 104. The closing of micro-switch 20—22 energizes relay RD, contact 14—22 closes forming a holding circuit through the normally closed contact 13—14 of micro-switch C–156. Solenoid SVAL$_4$, associated with four-way valve 100 is energized shifting the four-way valve and reversing the second intensifier unit 39 which is now moved to the left to charge the high pressure chamber C at the pre-delivery level. RD contact 8—6 closes energizing control solenoid SVB$_1$ thus opening low pressure delivery valve 124 so that low pressure fluid is supplied to the first intensifier unit 38 at the delivery pressure.

A modified arrangement of the intensifier units and controlling devices therefor to effect the continuous delivery of a compressible fluid at an exactly adjusted continuous delivery pressure is shown specifically in Figs. 2 and 7 of the drawings. In these figures, three single intensifier units 170, 172, and 174 are connected in parallel relation to deliver compressible fluid at the delivery pressure continuously to the delivery manifold 80. One of these single intensifier units together with the four-way valve and certain of the operating connections therefor is shown on an enlarged scale in Fig. 5. The intensifier unit, referred to, which may be the unit 170 of Fig. 2, comprises a casing having at its upper end a high pressure chamber E, an intermediate leakage chamber 178 and a low pressure chamber 180. The housing is fitted also with a movable plunger 182 having a reduced portion fitted into the high pressure chamber E and an enlarged portion 184 fitted into the low pressure chamber 180. The two ends of the low pressure chamber 180 are connected by pipe connections 186, 188 with ports formed in a four-way valve housing 190 which is fitted with a shiftable valve body 192. The four-way valve is also provided with an inlet connection 194 from the pumping unit 68 and an outlet connection 196 to the sump 197.

The hydraulic system illustrated in Fig. 2 operates briefly as follows:

The compressible fluid is supplied to the three intensifiers from a supply conduit 198 which is connected through branch conduits 200 to the high pressure chambers of the three intensifiers, 170, 172, and 174, and the delivery manifold 80 which is connected through branch conduits 204 and 206 to the high pressure chambers E, F, and G, respectively, of the intensifier units. The high pressure fluid is drawn into the respective high pressure chambers from supply through check valves 208, 210, and 212, respectively. The compressible fluid is delivered to the manifold 80 through check valves 213, 214 and 215, respectively.

A non-compressible low pressure fluid is directed to the low pressure chambers of the several intensifier units through connections which, as shown in Fig. 2, include the four-way valve 190, above referred to, and four-way valve 216 and 218 associated respectively with the intensifiers 172 and 174. The four-way valves 216 and 218 are connected with the low pressure chamber of the associated intensifier unit by means of conduits 220, 222, 224 and 226 in the same manner as four-way valve 190 is connected with intensifier unit 170. The delivery pump 68 and associated relief valve 106 act to deliver oil at a predetermined low pressure which corresponds to the charge pressure imparted thereby to the compressible fluid in the high pressure chambers of the system. The oil is delivered by pump 68 into a main supply conduit 228 and passes thence through branch conduits 194, 230 and 232 with their check valves 234, 236 and 238 to the respective four-way valves 190, 216 and 218. The delivery pump 104 and its associated relief valve 114, above referred to, are connected by means of a main supply line 239 and low pressure fluid control valves 240, 242 and 243, respectively, with the branch supply lines 194, 230 and 232 connecting in turn with the respective four-way valves.

The electrical system by means of which the three single intensifier units 170, 172, and 174 illustrated in Figs. 2, 5 and 7 are controlled include three micro-switches E–244, F–246, and G–248. The associated four-way valves 190, 216, and 218 are controlled by solenoids SVL$_1$ to SVL$_6$, inclusive. The three low pressure control valves 240, 242, and 243 are actuated by solenoids SVC$_1$—SVC$_2$ and SVC$_3$, respectively. There are also provided six relay coils indicated at LRA, LRB, LRC, LRD, LRE, and LRF, and six latch release coils indicated at LRRA, LRRB, LRRC, LRRD, LRRE and LRRF. In Fig. 5 there is also shown a detail of the operating connections for the micro-switch E–244. As shown in this figure the micro-switch is arranged to be acted upon by a switch contact arm 250 secured to a shift rod 252 mounted within the leakage chamber 178 of the intensifier unit 170. Movement of the plunger 182 to a raised limit position at the end of the delivery stroke causes the switch arm of the micro-switch to be shifted from its normally closed to its normally opened position, the parts returning to the alternate position as the plunger is again withdrawn downwardly.

The intensifier units operate basically in the same manner as those illustrated in Fig. 1. While the piston of one intensifier unit is moving to its limit position for delivery of compressible fluid and delivery pressure to the process, a piston of a second intensifier unit will be advanced under the influence of a non-compressible fluid supplied to the low pressure chamber at a slightly less than a pre-delivery pressure so that the high pressure cylinder of the second intensifier unit is charged with the compressible fluid at the pre-delivery pressure. The plunger of the second unit then pauses until completion of the stroke of the plunger of the first unit, and then is advanced at full pressure to deliver its increment of compressible fluid at the delivery pressure. At the same time the plunger of the third intensifier unit will have been retracted to draw a new supply of compressible fluid into the high pressure chamber.

The operation of the apparatus including the electrical connections shown in Figs. 2 and 7 is briefly as follows:

When the plunger of the intensifier unit 172 completes its delivery stroke for the delivery of compressible fluid from the high pressure chamber F at the delivery pressure the actuating arm of micro-switch B-246 shifts from its normally connected contact 25—26 to close contact 25—27. Relay LRB is energized to open LRB contact 10—11, to disconnect the valve solenoid $SVL_4$ and closing contact LRB 10—12 energizing the reversing switch solenoid SVL causing the plunger of intensifier unit 172 to pump down.

The micro-switch contact arm returns to its normally off position opening contact 25—27 so that relay LRRF is deenergized causing switch contact 18—19 to open thus deenergizing solenoid $SVC_2$ to close low pressure control valve 232. Relay LRRE is deenergized causing contact 13—14 to close thus deenergizing solenoid $SVL_6$ and switch contact 13—15 opens to deenergize solenoid $SVL_5$ causing the plunger associated with intensifier unit 174 to advance to charge the high compression chamber G at the pre-delivery pressure. Relay LRC is energized to energize solenoid SVC' thus opening the low pressure control valve 230 and causing the plunger associated with the intensifier unit 170 to deliver compressible fluid from the high compression chamber E at the delivery pressure.

When the plunger of intensifier unit 170 completes its delivery stroke the delivery of compressible fluid from the high pressure chamber E at the delivery pressure the actuating arm of micro-switch E-244 shifts from its normal open position to engage switch contact 4—6. Relay LRA is energized closing switch contact 7—9 to energize solenoid $SVL_1$ and switch contact 7—8 opens to deenergize solenoid $SVL_2$ shifting the position of the four-way reversing valve 190 and causing the plunger of the intensifier unit 170 to pump down. Latch relay coil LRRC is deenergized causing switch contact 16—17 to open deenergizing solenoid $SVC_1$ so that the supply of fluid pressure through low pressure control valve 230 is cut off and the low pressure fluid is thereafter supplied to intensifier unit 170 at the pre-delivery level by pump 60. Latch release coil LRRB is deenergized to close switch contact 10—11 and to energize $SVL_4$ and to open switch contact 10—12 deenergizing solenoid $SVL_3$ thus causing the plunger, associated with intensifier unit 172 to move upwardly to charge the high pressure chamber F at pre-delivery pressure. Relay LRD is energized closing switch contact 20—21, and energizing solenoid $SVC_3$ causing the plunger associated with intensifier unit 174 to be advanced to deliver compressible fluid from the high compression chamber G at delivery pressure.

When the plunger of intensifier unit 174 completes its delivery stroke for the delivery of compressible fluid from the high pressure chamber G at the delivery pressure the actuating arm of micro-switch G-248 is shifted from its off to its on position closing switch contact 22—24. Relay LRE is energized opening the contact 13—14 to deenergize solenoid $SVL_6$ and closing contact 13—15 to energize solenoid $SVL_5$ thus causing the plunger of the intensifier unit 174 to pump down. Latch releas coil LRRB is deenergized thus opening contact 20—21 and deenergizing solenoid $SVC_3$ to shut off the low pressure control valve 234. Latch release coil LRRA is deenergized to close contact 7—8 and thus to energize solenoid $SVL_2$ while contact 7—9 is open to deenergize solenoid $SVL_1$ thus reversing the position of the four-way reversing valve 190, and causing the plunger associated with intensifier unit 170 to move upwardly charging the high pressure chamber E at the pre-delivery pressure at the delivery pressure. Finally, coil LRRF is energized closing contact 18—19 and energizing relay $SVC_2$ causing the plunger associated with intensifier unit 172 to be advanced to deliver compressible fluid at the delivery pressure.

Another modified arrangement of the intensifier units and controlling devices therefor to effect the continuous delivery of the compressible fluid at an exactly adjusted continuous delivery pressure is shown specifically in Figs. 3, 8, and 9 of the drawings. In these figures two double intensifier units 260 and 262 are shown connected in series and with at least one capacity chamber, so that the first of the two double intensifier units 260 having high pressure chambers L and M is employed at all times to provide a supply of compressible fluid at the pre-delivery pressure, the compressed fluid thus provided being continuously charged into and thereafter discharged alternately from one and then the other of the two high pressure chambers N and O of the second intensifier unit 262. In this form of the device the first intensifier unit 260 acting in combination with a capacity chamber 264 and a suitable choke valve provides a preferred means for supplying the compressible fluid medium to the second intensifier unit 262 continuously at the desired charge pressure. In this form of the device the double plunger of the double intensifier unit 262 operates substantially as a metering valve but with the modification that it is positively moved in each direction to deliver increments of the compressed fluid at a very slightly increased delivery pressure, first from one and then the other of the two high pressure chambers N and O of the unit. In this form of the apparatus the low pressure fluid pump 68 is shown as connected at all times through connection 266, four-way reversing valve 268, and reversing connections 270, 272 with the double intensifier unit 260. The low pressure fluid pump 104 supplying low pressure fluid at the delivery level is connected through a pipe line 274, four-way reversing valve 276, and reversing connections 278, 280 to the second double intensifier unit 262. In this form of the device the high pressure hydraulic system includes an inlet pipe line 282 which is connected with branch lines and check valves 284, 286 with the respective high pressure chambers L and M. The compressed fluid is discharged from the high pressure chambers L and M through check valves 288 and 290 to delivery pipe line 292 in which the compressible fluid is maintained at pre-delivery pressure by means of the capacity chamber 264 and an outlet valve 294 which may take the form of a variable choke valve. Thence, the compressed fluid is passed through check valves 296, 298 to the two high pressure chambers N and O of the second intensifier unit 262. The compressed fluid at delivery pressure is delivered from the high pressure chambers through check valves 300, 302 to the delivery manifold 80, above referred to. To further control the delivery rate a second capacity chamber 304 may be provided in the delivery manifold 80.

Each of the two double intensifier units 260 and 262 shown in the modification of Figs. 3, 8, and 9 is controlled by electrical means which become operative when the intensifier plunger reaches the limit of its movement in either direction to shift the position of the associated four-way reversing valve, and thus to start the plunger moving in the reverse direction. In this form of the invention, the operation of the two intensifiers and their reversing valves are independent of one another. Inasmuch as the electrical connections are duplicated for each of the two units only those electrical connections associated with the intensifier unit 260 will be specially illustrated and described. The electrical connections referred to include the two micro-switches L-306 and M-308, and two solenoids SVA₁ and SVA₂ associated with the four-way reversing valve 268. There is also provided an electrical relay R. It will be understood that the two micro-switches L-306 and M-308 are identical with and are connected with the plunger of the double intensifier unit 260 in the same manner that the micro-switches A-140 and B-142 shown in Figs. 1 and 4 are connected into the double intensifier unit 38, there shown.

The operation of the electrical connections shown in Figs. 8 and 9 is briefly as follows:

Upon movement of the plunger of the double intensifier unit 260 to its limit position to the right micro-switch M-308 is actuated to close contact 3—5 thus energizing the relay R. Contact R 5—6 closes providing a holding circuit for the coil R. Contact R 9—10 closes energizing solenoid SVA' and contact R 9—11 opens deenergizing solenoid SVA₂ so that the four-way reversing valve is shifted to move the plunger of the double intensifier unit 260 to the left. The micro-switch L-308 contact arm now returns to its open position opening the contacts 3—5.

When the plunger of the double intensifier unit 260 reaches the limit of its movement to the left the micro-switch M-306 is actuated to disengage the contact 7—6, thus deenergizing the relay coil R. Holding contact R 5—6 drops out. Contact R 9—10 opens deenergizing coil SVA₁ and contact R 9—11 closes energizing solenoid SVA₂. The four-way reversing valve 268 is thus again shifted to reverse the direction of movement of the plunger of the double intensifier unit 260 which moves again to the right. The contact arm of micro-switch M-306 now shifts again to its normal position to close the contact 7—6.

I claim:

1. A fluid pressure system for delivering a continuous and steady flow of compressible fluid at a predetermined high delivery pressure which comprises, in combination, means for supplying said compressible fluid, a plurality of high pressure cylinders with high pressure chambers and pistons having high pressure faces, a delivery manifold, conduits connecting each of said cylinders with the means for supplying compressible fluid, conduits connecting each of said cylinders with the delivery manifold in parallel relation, means for imparting reciprocating delivery and return strokes to said pistons including means operable during at least the latter portion of the delivery stroke of each high pressure piston face to move said piston with a delivery pressure producing force, and means for producing in each said cylinder chamber a charge of said compressible fluid compressed to a charge pressure in the order of 1–10% less than the delivery pressure, and means for controlling the reciprocation of each of said pistons to effect said delivery strokes at delivery pressure in a continuous sequence.

2. A fluid pressure system for delivering a continuous and steady flow of compressible fluid at a predetermined high delivery pressure which comprises, in combination, means for supplying said compressible fluid at a charge pressure of 1–10% less than said delivery pressure, a plurality of high pressure cylinders with high pressure chambers and pistons having high pressure faces, means for imparting reciprocating delivery and return strokes to each of said pistons, means for controlling the reciprocation of each of said pistons to effect said delivery strokes in a continuous sequence, means connecting said high pressure cylinders with the supply means, and conduits connecting said high pressure cylinders in parallel relation to the delivery manifold.

3. A fluid pressure system for delivering a continuous and steady flow of compressible fluid at a predetermined high delivery pressure which comprises, in combination, means for supplying said compressible fluid at a charge pressure of 1–10% less than said delivery pressure, a plurality of high pressure cylinders with high pressure chambers and pistons having high pressure faces, means for imparting reciprocating delivery and return strokes to each of said pistons, means for controlling the reciprocation of each of said pistons to effect said delivery strokes in a continuous sequence, a delivery manifold, conduits connecting said cylinders with the charge pressure supply means, and with the delivery manifold in parallel relation, and check valves in said conduits arranged for directing said compressible fluid from the high pressure chambers during the delivery stroke of each high pressure piston in sequence to said delivery manifold.

4. A fluid pressure system for delivering a continuous and steady flow of compressible fluid at a predetermined high delivery pressure which comprises, in combination, means for supplying said compressible fluid at a charge pressure of 1–10% less than said delivery pressure, at least two high pressure cylinders with high pressure chambers and pistons having high pressure faces mechanically connected in opposed relation for reciprocating movement whereby one of said pistons delivers as the other is retracted, a delivery manifold, conduits connecting each of said cylinders with the charge pressure supply means, conduits connecting said cylinders in parallel relation with the delivery manifold, check valves in said conduits arranged for directing the compressible fluid from the high pressure chambers during the delivery stroke of each high pressure piston in sequence to said delivery manifold, and means reciprocating said pistons to effect a continuous delivery of said compressible fluid at the delivery pressure.

5. A fluid pressure system for delivering a continuous and steady flow of compressible fluid at a predetermined high delivery pressure which comprises, in combination, means for supplying said compressible fluid at a supply pressure, a plurality of high pressure cylinders with high pressure chambers and pistons having high pressure faces, a delivery manifold, conduits connecting each of said cylinders with the supply pressure means, conduits connecting each of said cylinders with the delivery manifold in parallel relation, means for imparting reciprocating delivery and return strokes to said pistons including means operable during a first portion of the delivery stroke of each high pressure piston face to move said piston with a charge pressure producing force, said charge pressure being from 1–10% less than the delivery pressure, and means operable upon completion of the delivery stroke of each successive high pressure piston face to continue said movement of a next succeeding high pressure piston in sequence with said delivery pressure producing force.

6. A fluid pressure system for delivering a continuous and steady flow of compressible fluid at a predetermined high delivery pressure which comprises, in combination, means for supplying said compressible fluid at a supply pressure, a plurality of high pressure cylinders with high pressure chambers and pistons having high pressure faces, a delivery manifold, conduits connecting each of said cylinders with the supply pressure means, conduits connecting each of said cylinders with the delivery manifold in parallel relation, means for imparting reciprocating delivery and return strokes to said pistons including means operable to move each piston with a delivery pressure producing force and alternatively with a charge pressure producing force, said charge pressure being from 1–10% less than the delivery pressure, means operable upon completion of the delivery stroke of each successive high pressure piston face to cause said piston to continue the reciprocating movement thereof with a charge pressure producing force and simultaneously to cause a next succeeding high pressure piston in sequence to continue movement in the delivery direction with a delivery pressure producing force.

7. A fluid pressure system for delivering a continuous and steady flow of compressible fluid at high pressure which comprises, in combination, intensifier devices comprising a plurality of high pressure piston faces of small area, and associated therewith low pressure piston faces of larger area arranged for moving the respective high pressure piston faces in opposed delivery and retracting directions, high pressure chambers and low pressure chambers housing said piston faces, a delivery manifold having parallel connections with said high pressure chambers including check valves adjusted to a predetermined delivery pressure, a low pressure non-compressible fluid source, and means for directing said low pressure fluid into said low pressure chambers in sequence at a pressure regulated to maintain a continuous delivery of said high pressure compressible fluid into said manifold at the delivery pressure, and means operable during the retracting stroke of each high pressure piston face for charging each high pressure chamber successively with compressible high pressure fluid at a charge pressure in the order of 1-10% below said predetermined delivery pressure whereby an even uninterrupted delivery of said compressible fluid is effected at a constantly maintained delivery pressure.

8. A fluid pressure system for delivering a continuous and steady flow of compressible fluid at high pressure which comprises in combination devices comprising a plurality of intensifier high pressure piston faces of small area, and associated therewith low pressure piston faces of larger area arranged for moving the respective high pressure piston faces in opposed delivery and retracting directions, high pressure chambers and low pressure chambers housing said piston faces, a delivery manifold having parallel connections with said high pressure chambers including check valves adjusted to a predetermined delivery pressure, a low pressure non-compressible fluid source, reversing valve means for selectively admitting to and exhausting low pressure fluid from each of said low pressure chambers, and means supplying low pressure fluid at a pressure regulated to produce delivery of said compressible fluid at a predetermined delivery pressure, means controlling said reversing valve means to direct said low pressure fluid into said low pressure chambers in sequence to maintain a continuous delivery of said high pressure compressible fluid into the manifold at the delivery pressure, and means operable during the retracting stroke of each high pressure piston faces for charging each high pressure chamber successively with high pressure fluid at a charging pressure in the order of 1-10% below said predetermined delivery pressure.

9. A fluid pressure system for delivering a continuous and steady flow of compressible fluid at high pressure which comprises, in combination, a double intensifier unit comprising a piston element having a plurality of high pressure piston faces of small area, and low pressure piston faces of larger area arranged for moving said piston element in opposite directions, high pressure chambers and low pressure chambers housing said piston faces, a delivery manifold having parallel connections with said high pressure chambers including check valves adjusted to a predetermined delivery pressure, a compressible charge pressure fluid supply system including successively acting intensifier elements, a capacity tank for storage of said compressible fluid compressed at charge pressure by said intensifier elements, and a regulable outlet valve for supplying high pressure compressible fluid continuously to said high pressure chambers at a charge pressure in the order of 1-10% below said predetermined delivery pressure, a low pressure non-compressible fluid source, reversing valve means directing said low pressure fluid into the low pressure chambers in sequence for reciprocating said piston element, and means for actuating said reversing valve means to maintain a continuous reciprocation of said piston element and thereby to maintain a continuous delivery of said high pressure compressible fluid in the manifold at the delivery pressure.

10. A fluid pressure system for delivering a continuous and steady flow of compressible fluid at high pressure which comprises in combination, a double intensifier unit comprising a piston element having two opposed high pressure piston faces of small area, and opposed low pressure piston faces of larger area for moving said piston element in opposite directions, high pressure chambers and low pressure chambers housing said high pressure and low pressure piston faces, a delivery manifold having parallel connections with said high pressure chambers including check valves adjusted to a predetermined delivery pressure, a compressible fluid supply system comprising a second double intensifier unit comprising a piston element having opposed high pressure piston faces of small area and opposed low pressure piston faces of larger area, high pressure chambers and low pressure chambers housing the piston faces of said second double intensifier unit, connections from each of the high pressure chambers of said second double intensifier unit including check valves, a capacity tank, and a regulating outlet valve for supplying compressible fluid continuously to said first mentioned high pressure chamber at a charge pressure in the order of 1-10% below the predetermined delivery pressure, a low pressure non-compressible fluid source, reversing valve means associated with the low pressure chambers of each double intensifier unit, means controlling each reversing valve means to continuously reciprocate the piston element of each double intensifier unit, and means supplying said low pressure fluid to each of said low pressure chambers including means regulating the pressure of said low pressure fluid supplied to the first mentioned low pressure chambers to effect the discharge of the compressible fluid into the delivery manifold at said delivery pressure.

11. A fluid pressure system for delivering a continuous and steady flow of compressible fluid at high pressure which comprises in combination a series of intensifier devices including a plurality of high pressure piston faces of small area and associated therewith low pressure piston faces of larger area for moving the respective high pressure piston faces in opposed delivery and retracting directions, high pressure chambers and low pressure chambers housing said high pressure and low pressure piston faces, a delivery manifold having parallel connections with said high pressure chambers including check valves adjusted to a predetermined delivery pressure, means supplying compressible fluid to said high pressure chambers, a low pressure non-compressible fluid source, reversing valve means connected with said low pressure chambers for directing said non-compressible fluid alternately against oppositely disposed low pressure piston faces, regulating valve means operable to feed said low pressure fluid to the reversing valve means and low pressure chambers connected therewith alternatively at a delivery producing pressure and at a charge pressure producing pressure below said delivery pressure, means for controlling said reversing valve means to reverse each of said high pressure piston faces at the limit of movement in each direction, and means for controlling said regulating valve means to initiate each delivery stroke of each high pressure piston face in sequence to build up a charge pressure of said compressible fluid in the associated high pressure chamber, and further responsive to the further movement of a next preceding high pressure piston face in sequence to a limit position of its delivery stroke to effect a further advance of each said high pressure piston face in sequence at the delivery producing pressure of said non-compressible low pressure medium.

12. A fluid pressure system for delivering a continuous and steady flow of compressible fluid at high pressure which comprises, in combination a series of intensifier devices including a plurality of high pressure piston faces of small area and associated therewith low pressure piston faces of larger area for moving the respective high pressure piston faces in opposed delivery and retracting directions, high pressure chambers and low pressure chambers housing said high pressure and low pressure faces, a delivery manifold having parallel connections with said high pressure chambers including check valves adjusted to a predetermined delivery pressure, means supplying compressible fluid to said high pressure chambers, a low pressure non-compressible fluid source, means for directing said low pressure fluid to said low pressure chambers for moving said high pressure piston faces in sequence to effect a continuous delivery of the high pressure fluid from the several high pressure chambers, means operable during a first portion of the delivery stroke of each high pressure piston face to supply said low pressure fluid at a pressure regulated to charge the high pressure chamber at a pressure from 1–10% below the delivery pressure of said compressible fluid, and means operable upon completion of the delivery stroke of each successive high pressure piston face to supply said low pressure fluid to the low pressure piston face associated with the next succeeding high pressure piston face in sequence at a pressure regulated to effect delivery of the high pressure compressible fluid by said succeeding piston at the delivery pressure.

13. A fluid pressure system for delivering a continuous and steady flow of compressible fluid at high pressure which comprises, in combination, a series of intensifier devices including a plurality of high pressure piston faces of small area and associated therewith low pressure piston faces of larger area for moving the respective high pressure piston faces in opposed delivery and retracting directions, high pressure chambers and low pressure chambers housing said high pressure and low pressure piston faces, a delivery manifold having parallel connections with said high pressure chambers including check valves adjusted to a predetermined delivery pressure, means supplying compressible fluid to said high pressure chambers, reversing valve means for directing low pressure fluid to the low pressure chambers housing opposed low pressure piston faces alternately to reciprocate the high pressure piston faces, means for supplying said non-compressible low pressure fluid to the low pressure chambers at a pressure regulated to produce a charge pressure within the high pressure chambers at a level below said delivery pressure, and electrical means for controlling said reversing valve means in said low pressure supply means operable upon completion of the discharge stroke of each successive high pressure piston face in overlapping sequence to reverse said piston at the charge producing pressure and further responsive to the completion of the delivery stroke of a preceding high pressure piston face to supply fluid to the low pressure piston face at the delivery producing pressure whereby a continuous delivery of compressible fluid to the delivery manifold at the delivery pressure is maintained.

14. A fluid pressure system for delivering a continuous and steady flow of compressible fluid at high pressure which comprises, in combination, a series of intensifier devices including a plurality of high pressure piston faces of small area and associated therewith low pressure piston faces of larger area for moving the respective high pressure piston faces in opposed delivery and retracting directions, high pressure chambers and low pressure chambers housing said high pressure and low pressure piston faces, a delivery manifold having parallel connections with said high pressure chambers including check valves adjusted to a predetermined delivery pressure, means supplying compressible fluid to said high pressure chambers, reversing valve means for directing low pressure fluid to the low pressure chambers housing opposed low pressure piston faces alternately to reciprocate the respective piston elements, means for supplying said non-compressible low pressure fluid to the low pressure chambers at a delivery producing pressure regulated to effect delivery of the compressible fluid at delivery pressure, means for supplying said non-compressible low pressure fluid to the low pressure chambers at a pressure regulated to produce a charge pressure within the high pressure chambers at 1–10% below the delivery pressure, valve means shiftable for supplying the low pressure fluid to the reversing valve means selectively at the charge producing pressure and at the delivery producing pressure, and an electrical control system comprising electrical means for shifting said reversing valve means, electrical means for shifting said charge producing and delivery producing pressure valve means, reversing valve control switch connections rendered operative upon movement of each high pressure piston face to its limit delivery position to reverse said high pressure piston face, and to condition said low pressure fluid valve means to supply fluid to the associated low pressure chamber at the charge pressure and to supply fluid to the low pressure chamber associated with a next preceding high pressure piston face in sequence to complete the discharge stroke thereof to deliver compressible fluid at the delivery pressure.

15. A fluid pressure system for delivering a continuous and steady flow of compressible fluid at high pressure which comprises, in combination, a series of intensifier devices including a plurality of high pressure piston faces of small area and associated therewith low pressure piston faces of larger area for moving the respective high pressure piston faces in opposed delivery and retracting directions, high pressure chambers and low pressure chambers housing said high pressure and low pressure piston faces, a delivery manifold having parallel connections with said high pressure chambers including check valves adjusted to a predetermined delivery pressure, means supplying compressible fluid to said high pressure chambers, reversing valve means for directing low pressure fluid to the low pressure chambers housing opposed low pressure piston faces alternately to reciprocate the respective piston element, means for supplying said non-compressible low pressure fluid pressure to the low pressure chambers at a delivery producing pressure regulated to effect delivery of the compressible fluid from the associated high pressure chambers at delivery pressure, means for supplying said non-compressible low pressure fluid to the low pressure chambers at a pressure regulated to produce a charge pressure within the associated high pressure chambers at 1–10% below the delivery pressure, valve means shiftable for supplying the low pressure fluid to the reversing valve means selectively at the charge producing pressure and at the delivery producing pressure, and means controlling said reversing valve means whereby said intensifier high pressure piston faces are operated in progressive overlapping sequence to effect movement of said high pressure piston faces to continuously deliver compressible fluid from said high pressure chambers, means operative at each reversal of said high pressure piston faces to supply said low pressure fluid at the charge producing pressure, and means operable upon completion of the delivery stroke of each successive high pressure piston face to supply said low pressure fluid to the next preceding high pressure piston face in the sequence at the delivery producing pressure.

16. A fluid pressure system for delivering a continuous and steady flow of compressible fluid at high pressure which comprises, in combination, a plurality of double intensifier units each comprising a piston element having two opposed high pressure piston faces of small area and opposed low pressure piston faces of larger area for moving said piston elements in opposite directions, high pressure chambers and low pressure chambers housing said high pressure and low pressure piston faces, a delivery manifold having parallel connections with said high pressure chambers including check valves adjusted to a predetermined delivery pressure, means supplying compressible fluid to said high pressure chambers, a low pressure non-compressible fluid source, reversing valve means for directing low pressure fluid to the low pressure chambers housing opposed low pressure piston faces alternately to reciprocate the piston elements and high pressure piston faces therewith in alternating delivery and retracting strokes, pressure regulating means operable to admit said low pressure fluid to the reversing valve means and low pressure chambers connected therewith alternatively at a delivery producing pressure and at a charge pressure for said compressible fluid in the order of 1–10% less than said delivery pressure, means for actuating said reversing valve means to reverse each piston element at the end of the delivery stroke in each direction, and control means for actuating said pressure regulating means operating to start each high pressure piston delivery stroke at charge pressure, and further operative upon completion of each delivery stroke of one piston element to continue the delivery stroke of another piston element in a predetermined sequence at said delivery pressure.

17. A fluid pressure system for delivering a continuous and steady flow of compressible fluid at high pressure which comprises, in combination, a plurality of double intensifier units each comprising a piston element having two opposed high pressure piston faces of small area and opposed low pressure piston faces of larger area for moving said piston elements in opposite directions, high pressure chambers and low pressure chambers housing said high pressure and low pressure piston faces, a delivery manifold having parallel connections with said high pressure chambers including check valves adjusted to a predetermined delivery pressure, means supplying compressible fluid to said high pressure chambers, a low pressure non-compressible fluid source, reversing valve means for directing low pressure fluid to the low pressure chambers housing opposed low pressure piston faces alternately to reciprocate the piston elements and high pressure piston faces therewith in alternating delivery and retracting strokes, pressure regulating means operable to admit said low pressure fluid to the reversing valve means and low pressure chambers connected therewith alternatively at a delivery producing pressure and at a charge pressure for said compressible fluid in the order of 1–10% less less than said delivery pressure, valve means shiftable for supplying the low pressure fluid to the reversing valve means selectively at the charge producing pressure and at the delivery producing pressure, electrical means for shifting said reversing valve means to reverse each piston element at the end of its delivery stroke, and electrically operated means for controlling said shiftable valve means to start each high pressure piston delivery stroke at the charge pressure and further operative upon the completion of each successive delivery stroke to shift said valve means to complete the delivery stroke of another piston element and high pressure piston face therewith in sequence at the delivery pressure.

18. A fluid pressure system for delivering a continuous and steady flow of compressible fluid at high pressure which comprises, in combination, a plurality of double intensifier units each comprising a piston element having two opposed high pressure piston faces of small area and opposed low pressure piston faces of larger area for moving said piston elements in opposite directions, high pressure chambers and low pressure chambers housing said low pressure and high pressure piston faces, a delivery manifold having parallel connections with said high pressure chambers including check valves adjusted to a predetermined delivery pressure, means including check valves supplying compressible fluid to said high pressure chambers, means including a pump and regulating valve means for supplying said non-compressible low pressure fluid to the low pressure chambers at a delivery producing pressure for said compressible fluid, means including a second pump and a second regulating valve means for supplying said non-compressible low pressure fluid to the low pressure chambers at a charge pressure for said compressible fluid in the order of 1–10% less than said delivery pressure, valve means shiftable for supplying the low pressure fluid to the reversing valve means selectively at the charge producing pressure and at the delivery producing pressure, means to actuate said reversing valve means to reverse each piston element at the end of its delivery stroke, and electrically operated means for controlling said shiftable valve means to start each high pressure piston delivery stroke at the charge pressure and further responsive to the completion of each successive delivery stroke to shift said valve means to complete the delivery stroke of another piston element and high pressure piston face therewith at the delivery pressure.

References Cited in the file of this patent
UNITED STATES PATENTS

| | | |
|---|---|---|
| 2,293,076 | Ponting | Aug. 18, 1942 |
| 2,463,552 | Newhall | Mar. 8, 1949 |
| 2,592,940 | Monoyer | Apr. 15, 1952 |